United States Patent
Kobayashi et al.

(10) Patent No.: US 6,189,823 B1
(45) Date of Patent: Feb. 20, 2001

(54) FISHING REEL HAVING SIDE PLATES EFFICIENTLY ATTACHABLE TO AND DETACHABLE FROM FRAMES OF REEL BODY

(75) Inventors: Mikiharu Kobayashi, Fuchu; Nobuyuki Yamaguchi, Tama, both of (JP)

(73) Assignee: Daiwa Seiko, Inc., Higashikurume (JP)

(*) Notice: Under 35 U.S.C. 154(b), the term of this patent shall be extended for 0 days.

(21) Appl. No.: 09/272,778

(22) Filed: Mar. 19, 1999

(30) Foreign Application Priority Data

Mar. 30, 1998 (JP) .................................................. 10-083945
Mar. 31, 1998 (JP) .................................................. 10-085852

(51) Int. Cl.[7] .................................................. A01K 89/015
(52) U.S. Cl. ........................ 242/312; 242/315; D22/141
(58) Field of Search .................. 242/310, 312, 242/314, 315, 249, 261; D22/140, 141

(56) References Cited

U.S. PATENT DOCUMENTS

| | | | |
|---|---|---|---|
| 766,959 | * 8/1904 | Meisselbach et al. | 242/310 |
| 2,485,800 | * 10/1949 | Zimmerman | 242/310 X |
| 3,612,436 | * 10/1971 | Shakespeare et al. | 242/261 X |
| 4,638,958 | * 1/1987 | Furomoto | 242/310 |
| 4,821,978 | * 4/1989 | Kaneko | 242/310 |
| 5,292,087 | * 3/1994 | Sato | 242/310 X |
| 5,799,892 | * 9/1998 | Sato | 242/310 X |
| 5,810,273 | * 9/1998 | Carpenter | 242/261 |
| 5,873,535 | * 2/1999 | Jeung | 242/310 X |
| 5,996,920 | * 12/1999 | Yamaguchi | 242/314 X |

FOREIGN PATENT DOCUMENTS

| | | |
|---|---|---|
| 55-30144 | 7/1980 | (JP) . |
| 56-66263 | 6/1981 | (JP) . |
| 60-8693 | 3/1985 | (JP) . |
| 6-20388 | 6/1994 | (JP) . |

\* cited by examiner

Primary Examiner—Donald P. Walsh
Assistant Examiner—Emmanuel M. Marcelo
(74) Attorney, Agent, or Firm—Oblon, Spivak, McClelland, Maier & Neustadt, P.C.

(57) ABSTRACT

A fishing reel having side plates which can be attached to and detached from frames of a reel body with higher efficiency. In this fishing reel, a retaining ring is fitted into a fitting groove that is formed on a receiving portion of a left-hand side plate, whereupon the movable range of a left-hand ring member is restricted by the retaining ring that partially projects from the fitting groove. Thus, the ring member can always be supported for rotation on the receiving portion of the left-hand side plate without being disengaged from it.

12 Claims, 13 Drawing Sheets

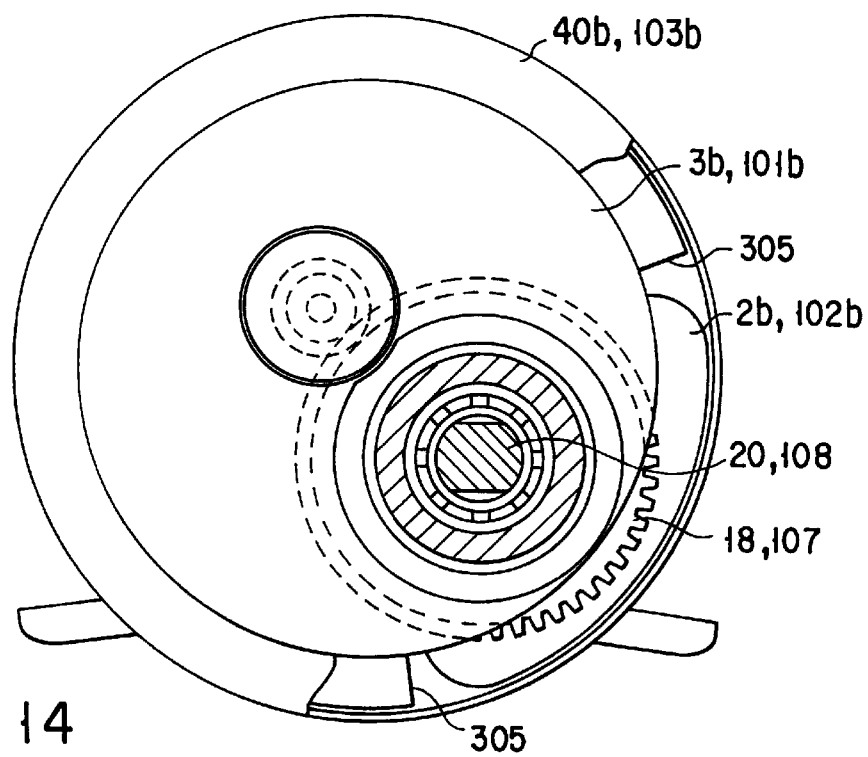
FIG. 14
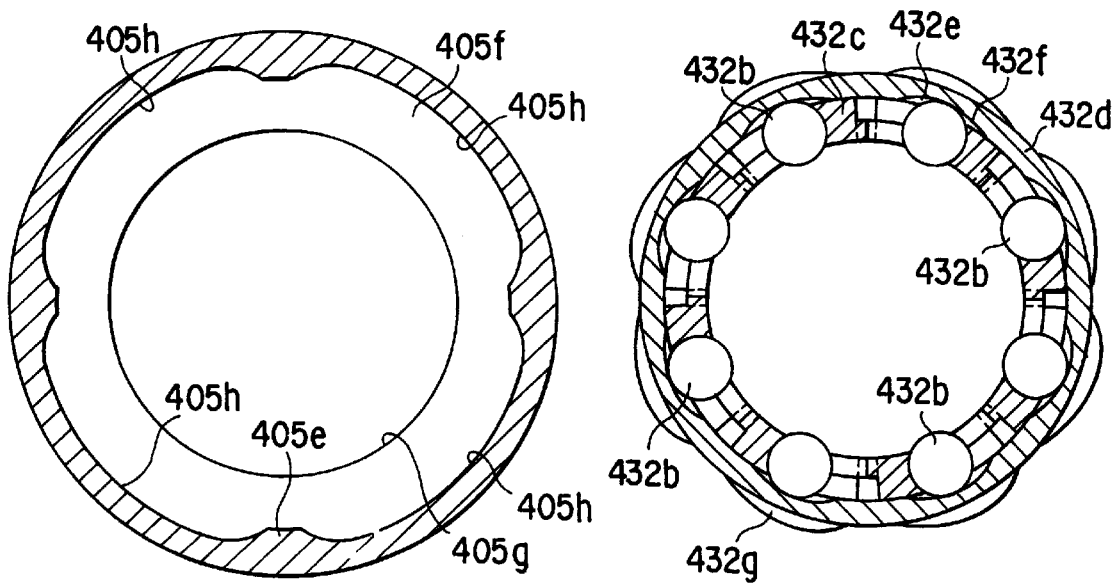
FIG. 15A
FIG. 15B

FISHING REEL HAVING SIDE PLATES EFFICIENTLY ATTACHABLE TO AND DETACHABLE FROM FRAMES OF REEL BODY

BACKGROUND OF THE INVENTION

The present invention relates to a fishing reel of which side plates can be attached to and detached from frames of a reel body with higher efficiency.

Conventionally, a side plate that holds a sound-producing mechanism, braking mechanism, bearing for supporting a spool shaft, etc. is attached to one side portion of a frame that constitutes the body of a fishing reel.

The side plate may be attached to the one side portion of the frame by means of a screw, for example. Alternatively, it may be screwed on the one side portion of the frame with the aid of a ring, as described in Jpn. UM Appln. KOKOKU Publication No. 55-30144 or Jpn. UM Appln. KOKAI Publication No. 56-66263, for example.

According to the mounting method described in Jpn. UM Appln. KOKOKU Publication No. 55-30144 or Jpn. UM Appln. KOKAI Publication No. 56-66263, a thread-engagement portion that can engage the outer periphery of the frame is formed on one side portion of the inner peripheral surface of the ring, and a stopper portion that can retain the side plate is formed on the other side portion of the inner peripheral surface. The side plate can be attached to the frame by screwing the one side portion of the ring on the frame.

However, the mounting method described in Jpn. UM Appln. KOKOKU Publication No. 55-30144 or Jpn. UM Appln. KOKAI Publication No. 56-66263 has the following first problem. If the ring is loosened and removed from the frame, the side plate is disengaged from the ring at the same time. In some cases, therefore, the ring may slip off the side plate and be lost. According to this mounting method, moreover, the ring and the side plate must be separately attached to or detached from the frame, thus requiring troublesome operation and resulting in lowering of the efficiency of attachment or detachment operation.

In general, a fishing reel comprises a spool wound with a fishing line, a reel body supporting the spool for rotation, and a take-up drive section for rotating the spool. The reel body includes left- and right-hand frames that support the spool and side plates attached individually to the respective lateral portions of the frames.

The take-up drive section is supported by means of a supporting side plate which is attached firmly to its corresponding frame by means of screws lest it hinder winding operation.

A driving force transmission mechanism, level-wind mechanism, drive mechanism, etc. are arranged side by side in a space between the supporting side plate and the frame. The transmission mechanism serves to transmit a driving force from the take-up drive section to the spool. The level-wind mechanism uniformly winds the fishing line on the spool. The drive mechanism is used to drive the level-wind mechanism. Thus, the supporting side plate stores these mechanisms and covers their outer peripheries. The arrangement of the fishing reel of this type is described in Jpn. UM Appln. KOKOKU Publications Nos. 60-8693 and 6-20338, for example, and is generally known.

However, this arrangement of the fishing reel involves the following second problem. The supporting side plate that is fixedly attached to the frame must store the various drive mechanisms that are arranged between itself and the frame and cover their outer peripheries. Therefore, the outside diameter of the supporting side plate should inevitably be increased in proportion to the diametrical dimensions of the drive mechanisms as a whole. Thus, the reel is subject to drawbacks in grip performance and portability.

BRIEF SUMMARY OF THE INVENTION

A first object of the present invention is to solve the first problem described above by providing a fishing reel of which side plates can be attached to and detached from frames of a reel body with higher efficiency.

In order to achieve the above object, a fishing reel according to the present invention comprises a frame, side plates located on the opposite sides of the frame, individually, a ring member for removably attaching at least one of the side plates to the frame, mounting means capable of removably mounting the ring member on the frame, and a retaining member for rotatably supporting the ring member on the side plate without the possibility of disengagement.

A second object of the present invention is to solve the second problem described above by providing a fishing reel of which side plates can be minimized in outside diameter so that the reel is small-sized as a whole.

In order to achieve the above object, a fishing reel according to the present invention comprises a spool wound with a fishing line and a reel body supporting the spool for rotation, the reel body including left- and right-hand frames supporting the spool and side plates attached to the respective lateral portions of the frames. The frame facing that side plate which supports a take-up drive section for rotating the spool includes an opening formed in a surface thereof opposite to the side plate and a storage space defined inside the opening, having a diameter larger than that of the opening, and capable of storing at least the take-up drive section in the axial direction thereof, the opening being closed by the side plate.

BRIEF DESCRIPTION OF THE SEVERAL VIEWS OF THE DRAWING

FIG. 14 is a view showing an arrangement of a fishing reel according to a third modification of the invention.

FIG. 15A is a sectional view showing an arrangement of a stabilizer of a one-way clutch applied to a fourth embodiment of the invention.

FIG. 15B is a sectional view showing an arrangement of the principal part of the one-way clutch applied to the fourth embodiment of the invention.

DETAILED DESCRIPTION OF THE INVENTION

Figure 1:
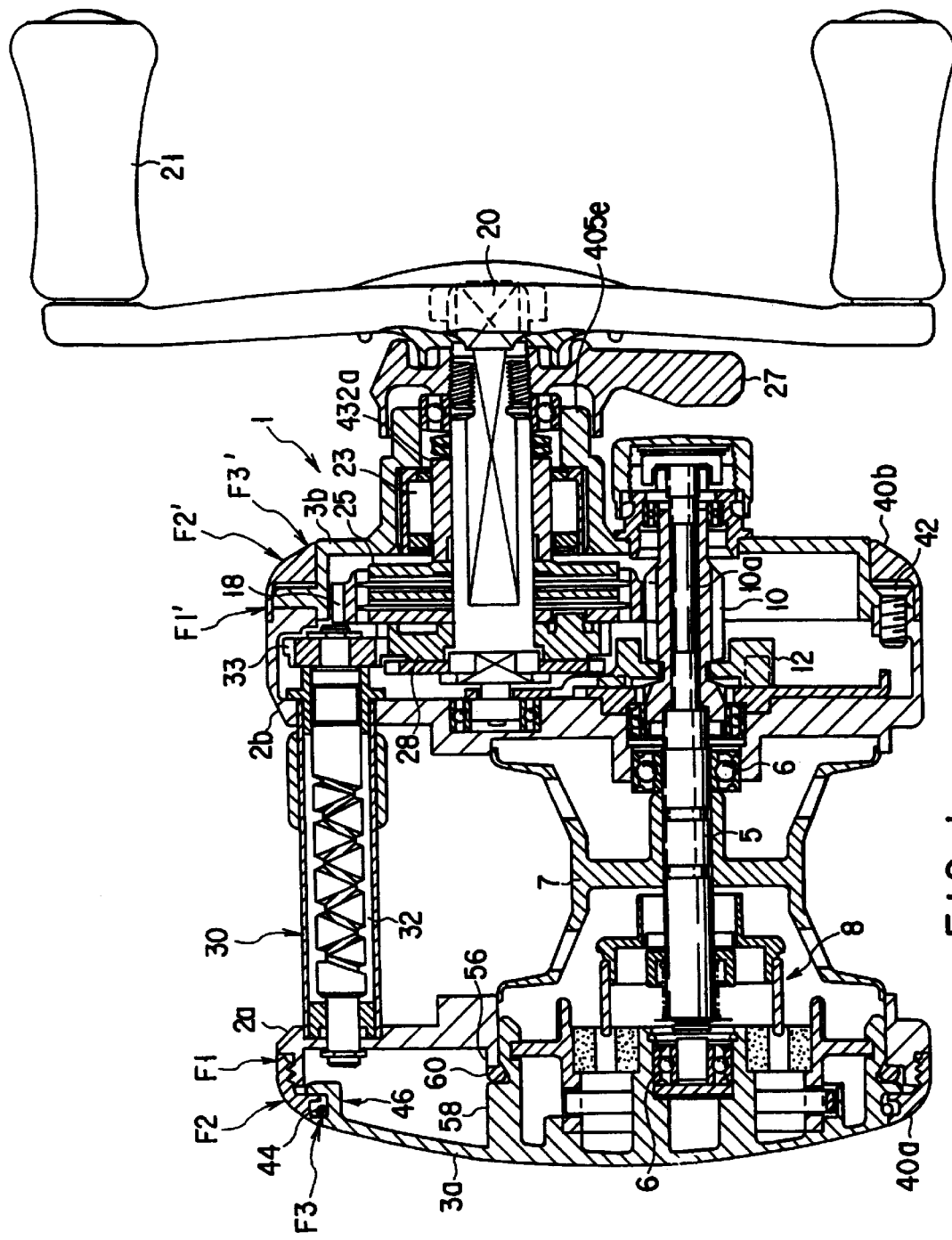
FIG. 1 is a view showing the internal structure of a fishing reel according to a first embodiment of the present invention.
Figure 2:
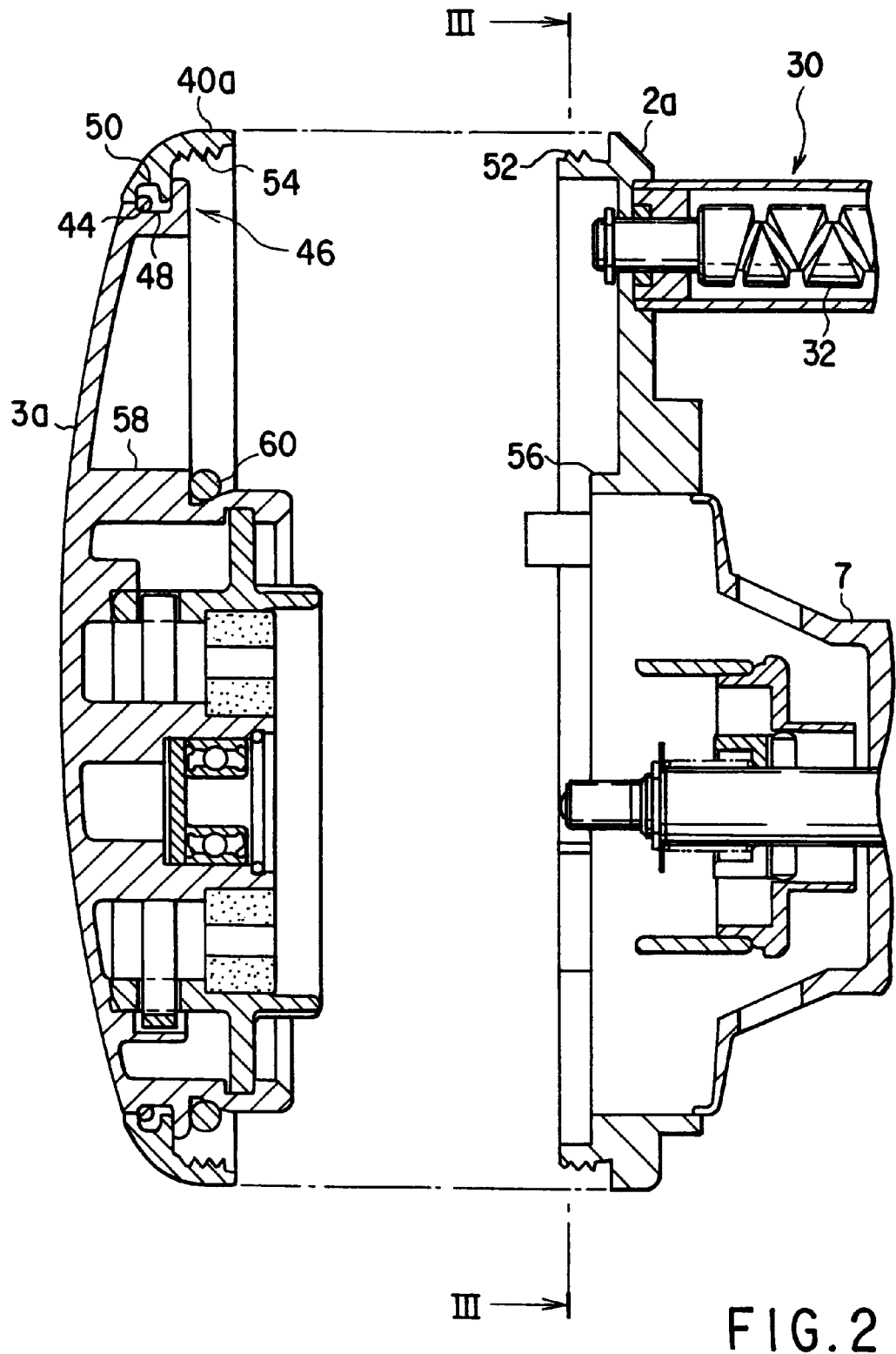
FIG. 2 is an enlarged view showing a left-hand side plate, left-hand ring member, and left-hand frame.

A fishing reel according to a first embodiment of the present invention will now be described with reference to the accompanying drawings. The fishing reel according to the present embodiment is a circular double-bearing type fishing reel.

As shown in FIGS. 1 to 3, 4A and 4B, a reel body 1 comprises left- and right-hand frames 2a and 2b and circular left- and right-hand side plates 3a and 3b arranged beside the frames 2a and 2b, respectively. At least one of the side plates 3a and 3b can be removably attached to the lateral portion of the frame 2a or 2b by means of a mounting mechanism (mentioned later).

The left- and right-hand frames 2a and 2b, along with a plurality of support posts between them, are integrally formed of a metal or resin material, for example. Fixed spaces are defined between the frames 2a and 2b and the side plates 3a and 3b, and various mechanisms, such as driving force transmission systems, drag systems, etc., are stored in the spaces.

A spool shaft 5 is rotatably supported between the left- and right-hand side plates 3a and 3b (left- and right-hand frames 2a and 2b), and a spool 7 is mounted on the central portion of the shaft 5.

An anti-backlash mechanism 8 is provided on the spool shaft 5 on the side of the left-hand side plate 3a. The mechanism 8 serves to prevent excessive rotation of the spool 7 and backlash during the discharge of a fishing line. On the side of the right-hand side plate 3b of the spool shaft 5, a pinion 10 is rotatably supported on a pinion shaft 10a. The pinion 10 is designed to slide axially to engage or be disengaged from the spool shaft 5. The pinion 10 is formed having a circumferential groove that mates with a clutch plate 12. The pinion 10 can be caused to engage the spool shaft 5 (clutch ON) or be disengaged from the shaft 5 (clutch OFF) by moving the plate 12 axially along the pinion shaft 10a.

On the other hand, a handle shaft 20 is rotatably supported on the right-hand side plate 3b. The shaft 20 supports a drive gear 18 that engages the pinion 10. A handle 21 is mounted on the distal end portion the handle shaft 20, and a one-way clutch 23 is attached to the middle portion of the shaft 20. A friction plate (drag mechanism) 25, which engages the drive gear 18, is provided on the proximal end portion of the handle shaft 20.

The friction plate 25 is designed so that it can apply a fixed drag to the drive gear 18 as a drag control member 27 beside the handle 21 is rotated and caused frictionally to engage the gear 18. Further, the handle shaft 20 is provided with a gear 28 that rotates integrally with the drive gear 18. The gear 28 is in mesh with a driving gear 33 for driving a worm shaft 32 of a level-wind mechanism 30.

A line guide member (not shown) is in engagement with the worm shaft 32 of the level-wind mechanism 30. It is formed having a hole through which the fishing line is passed. The guide member can be reciprocated by rotating the shaft 32 by means of the driving gear 33.

If the handle 21 is rotated in this arrangement, the rotatory motion is transmitted from the drive gear 18 to the driving gear 33 through the gear 28, whereupon the worm shaft 32 is rotated. At the same time, the rotatory motion is transmitted from the drive gear 18 to the spool 7 through the pinion 10, whereupon the spool 7 is rotated. When the line guide member is reciprocated as this is done, the fishing line is wound uniformly on the spool 7.

The following is a description of a mounting mechanism for removably mounting at least one of the side plates 3a and 3b on the lateral portion of the frame 2a or 2b.

The mounting mechanism according to the present embodiment comprises left- and right-hand ring members 40a and 40b and mounting means. The ring members 40a and 40b can be rotatably attached to at least one of the side plates 3a and 3b. The mounting means can removably mount the ring members 40a and 40b on the left- and right-hand frames 2a and 2b, respectively.

The left- and right-hand ring members 40a and 40b have their outer peripheral surfaces curved so that no projections or steps are formed ranging from the respective outer peripheral surfaces of the frames 2a and 2b to those of the side plates 3a and 3b through those of the ring members 40a and 40b (i.e., so that the whole surface of the reel body 1 is smooth and solid) when they are mounted on the frames 2a and 2b by means of the mounting means. A specific shape of the outer peripheral surface of each ring member will be mentioned later.

In the present embodiment, the right-hand side plate 3b can be attached to the right-hand frame 2b by means of screws 42 or by screwing or fitting, for example. The right-hand ring member 40b can be attached to the right-hand frame 2b by screwing, fitting, or cam-locking (see FIG. 6, mentioned later), for example. In the case where the screws 42 are used, they can be concealed under the right-hand ring member 40b, so that they never mar the appearance of the reel body 1.

According to the present embodiment, a substantially C-shaped retaining ring 44 is used as means for mounting the left-hand ring member 40a on the left-hand side plate 3a for free rotation. The ring 44 can be elastically fitted on the side plate 3a.

A receiving portion 46 for rotatably supporting the left-hand ring member 40a is formed on the outer peripheral portion of the left-hand side plate 3a. A fitting groove 48 for the retaining ring 44 is formed on that part of the receiving portion 46 which faces the ring member 40a. On the other hand, a relief groove 50 is formed on that part of the ring member 40a which faces the fitting groove 48 (see FIGS. 2, 4A and 4B, in particular).

The following is a description of a method for rotatably supporting the left-hand ring member 40a on the left-hand side plate 3a by means of the retaining ring 44 plate without the possibility of disengagement.

First, the retaining ring 44 is elastically deformed and expanded by means of a jig (not shown) in a manner such that it is directed to the inner part of the relief groove 50 of the left-hand ring member 40a. In this state, the ring member 40a is slid along the receiving portion 46 of the left-hand side plate 3a by means of the jig. The jig is drawn out with a given timing immediately before the ring member 40a is fully situated on the receiving portion 46 of the side plate 3a. Then, the ring member 40a is fully situated on the receiving portion 46. As this is done, the retaining ring 44 is contracted by its own elastic force, and is fitted in the fitting groove 48 of the receiving portion 46.

The fitting groove 48 is formed having a depth smaller than the diameter (W) of the retaining ring 44 in the groove 48. Therefore, the left-hand ring member 40a has its movable range restricted by the ring 44 that partially projects from the groove 48, and can never be disengaged from the receiving portion 46. In this state, the ring member 40a is always supported for rotation on the receiving portion 46 of the left-hand side plate 3a (see FIGS. 2 and 4B). In consequence, the left-hand ring member 40a and the left-hand side plate 3a are always connected integrally to each other in a manner such that the ring member 40a can rotate relatively to the side plate 3a.

The following is a description of mounting means for removably mounting the left-hand ring member 40a on the lateral portion of the left-hand frame 2a.

According to the present embodiment, the mounting means is composed of an external thread portion 52 on the outer peripheral surface of the lateral portion of the left-hand frame 2a and an internal thread portion 54 on the lateral portion (opposed to the lateral portion of the frame 2a) of the left-hand ring member 40a, for example.

According to this mounting means, the internal thread portion 54 is advanced screwing on the external thread portion 52 so that the left-hand ring member 40a is fitted on the left-hand frame 2a. Thus, the left-hand side plate 3a can be attached to the left-hand frame 2a by means of the ring member 40a.

Figure 3:
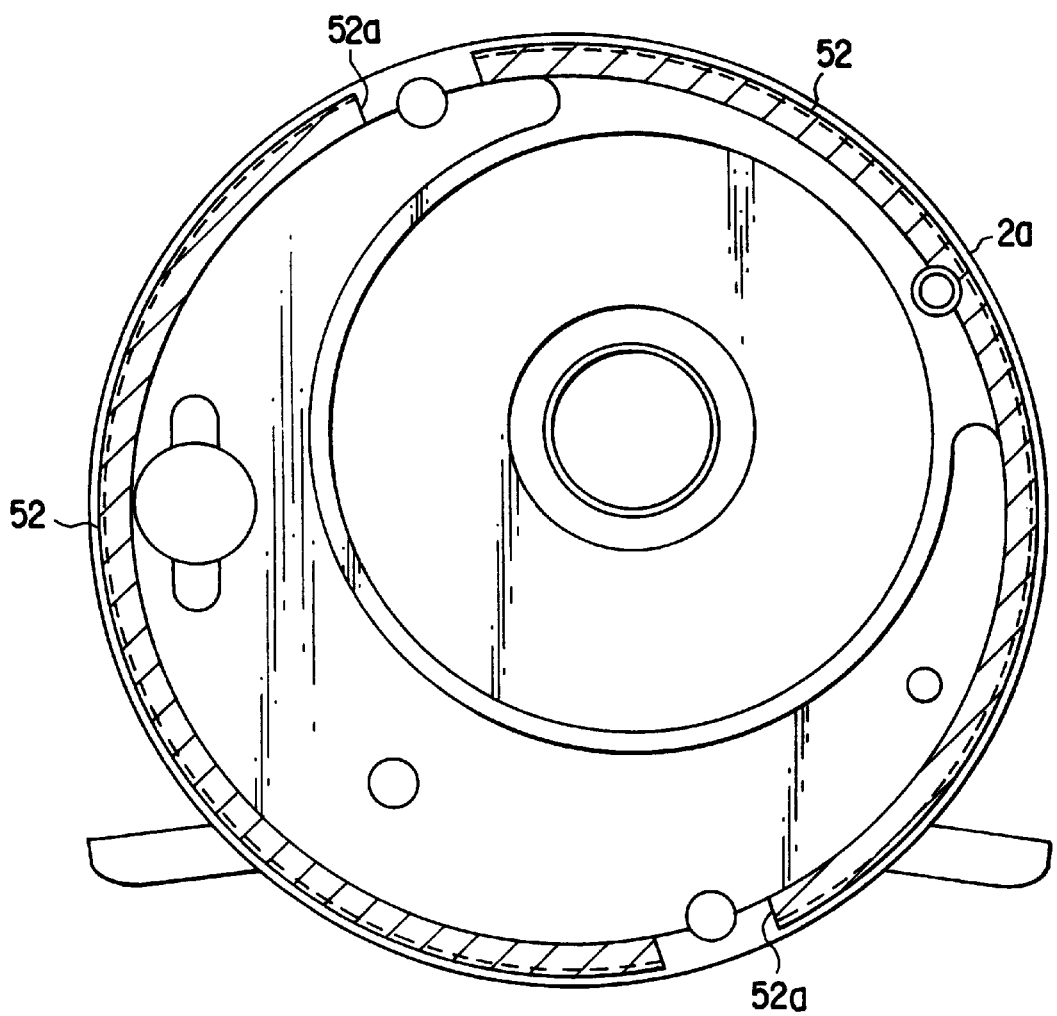
FIG. 3 is a sectional view taken along line III—III of FIG. 2.

In this case, the external thread portion 52 of the left-hand frame 2a would rather be divided into a plurality of parts (two parts in the present embodiment) by a plurality of (or two) notches 52a, as shown in FIG. 3, than be formed continuously along the outer peripheral surface of the lateral portion of the frame 2a.

If it is divided in this manner, the external thread portion 52 itself can be elastically deformed. When the internal thread portion 54 of the left-hand ring member 40a is caused to engage the external thread portion 52, therefore, the elasticity of the external thread portion 52 makes their engagement more reliable. Thus, the ring member 40a can be firmly attached to the left-hand frame 2a with stability.

If the shape of the left-hand ring member 40a is changed to cause the internal thread portion 54 to be deformed, moreover, the external thread portion 52 can be elastically deformed to absorb the deformation of the internal thread portion 54. Accordingly, the ring member 40a can always be attached securely and firmly to the left-hand frame 2a without being influenced by the change of shape of the left-hand ring member 40a.

Since there is some play between the fitting groove 48 of the receiving portion 46, retaining ring 44, and left-hand ring member 40a, the left-hand side plate 3a sometimes may be subject to backlash when it is mounted on the left-hand frame 2a.

If an elastic member 60, for example, is interposed between a first extending portion 56, which extends from the left-hand frame 2a toward the left-hand side plate 3a, and a second extending portion 58, which extends from the side plate 3a toward the first extending portion 56, in this case, the side plate 3a can be securely attached to the frame 2a without backlash.

The elastic member 60 may be formed of a soft material such as rubber or resin. If it is interposed between the first and second extending portions 56 and 58, its elasticity presses the left-hand side plate 3a against the left-hand ring member 40a in engagement with the left-hand frame 2a. Thus, the side plate 3a can be securely fixed without backlash.

Further, the left-hand ring member 40a has a substantially curved outer peripheral surface. When the left-hand side plate 3a is securely attached to the left-hand frame 2a by means of the ring member 40a without backlash, therefore, no projections or steps can be formed in the region ranging from the outer peripheral surface of the left-hand frame 2a to that of the left-hand side plate 3a through that of the left-hand ring member 40a. Thus, the whole surface of the reel body 1 is smooth and solid.

Figure 4A:
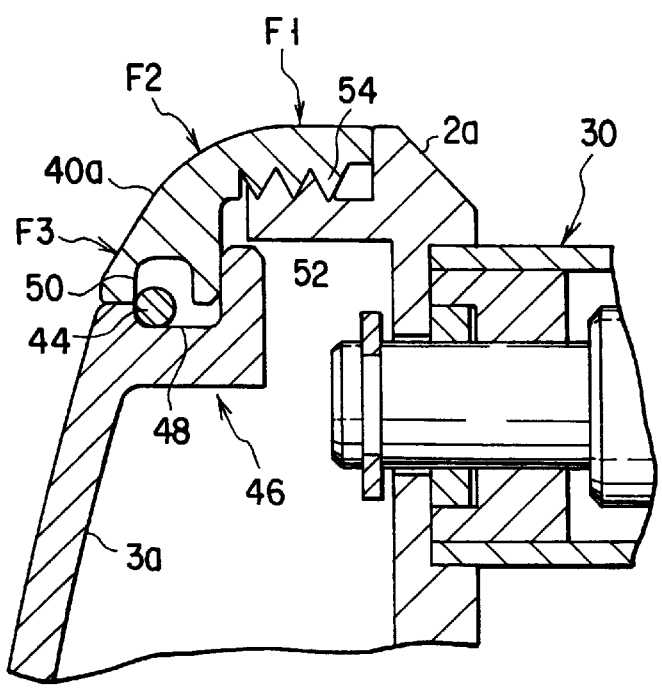
FIG. 4A is a partial sectional view showing the way the left-hand side plate is attached to the left-hand frame by means of the left-hand ring member.

More specifically, the left-hand ring member 40a according to the present embodiment includes a frame-side outer peripheral surface F1, a curved outer peripheral surface F2 continuous with the surface F1, and a side-plate-side outer peripheral surface F3 continuous with the surface F2, as shown in FIGS. 1 and 4A.

The frame-side outer peripheral surface F1 is situated substantially flush with the outer peripheral surface of the left-hand frame 2a, while the side-plate-side outer peripheral surface F3 is situated substantially flush with the outer peripheral surface of the left-hand side plate 3a. The curved outer peripheral surface F2 is formed having an optimum curvature in consideration of the grip performance, angling performance, and appearance.

As shown in FIG. 1, the right-hand ring member 40b, like the left-hand ring member 40a, includes a frame-side outer peripheral surface F1', a curved outer peripheral surface F2' continuous with the surface F1', and a side-plate-side outer peripheral surface F3' continuous with the surface F2'.

The frame-side outer peripheral surface F1' is situated substantially flush with the outer peripheral surface of the right-hand frame 2b, while the side-plate-side outer peripheral surface F3' is situated substantially flush with the outer peripheral surface of the right-hand side plate 3b. The curved outer peripheral surface F2' is formed having an optimum curvature in consideration of the grip performance, angling performance, and appearance.

Thus, according to the present embodiment, the left-hand ring member 40a is connected integrally to the left-hand side plate 3a for rotation by means of the retaining ring 44. If the ring member 40a is loosened and removed from the left-hand frame 2a, therefore, the side plate 3a can never be disengaged from the ring member 40a. Thus, the ring member 40a can be prevented from slipping off the side plate 3a and being lost.

According to the present embodiment, moreover, the left-hand ring member 40a and the left-hand side plate 3a can always be handled as one unit, so that the side plate 3a can be securely attached to or detached from the left-hand frame 2a with ease by only tightening or loosening the ring member 40a on the frame 2a. Thus, the efficiency of operation for attaching to and detaching the side plate 3a from the frame 2a can be improved.

According to the present embodiment, furthermore, the retaining ring 44 can be compactly stored in a limited space in which the left-hand ring member 40a and the left-hand side plate 3a face each other, without interfering with other functional components.

Figure 5A:
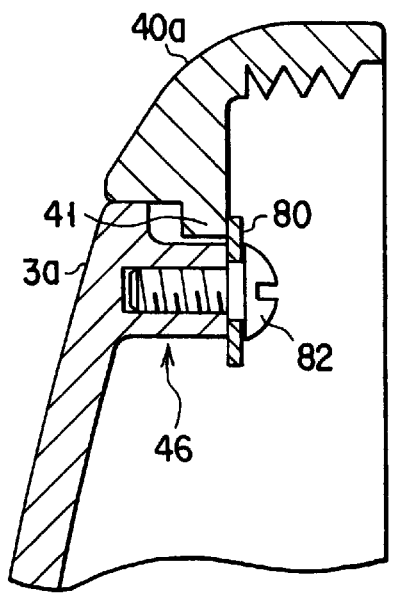
FIG. 5A is a view showing a modification of the fishing reel according to the invention in a state such that the left-hand ring member is attached to the left-hand side plate for rotation by means of a screw.
Figure 4B:
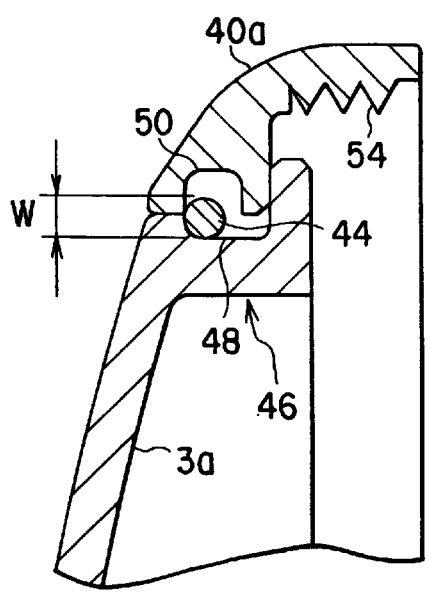
FIG. 4B is a partial sectional view showing the way the left-hand ring member is attached to the left-hand side plate for rotation.

In the embodiment described above, the left-hand ring member 40a is connected integrally to the left-hand side plate 3a for rotation by means of the retaining ring 44. Alternatively, however, a ring-shaped or rectangular backup member 80 may be applied to the receiving portion 46 of the side plate 3a so that a ring-shaped collar portion 41 of the ring member 40a is rotatably held between the member 80 and the receiving portion 46, as shown in FIG. 5A, for example. The backup member 80 may be attached to the receiving portion 46 by any of various methods including fixing by means of a screw 82, adhesive bonding, fitting, etc.

After the left-hand ring member 40a is positioned on the receiving portion 46 of the left-hand side plate 3a, according to this mounting method, the backup member 80 is fastened to the receiving portion 46 by means of the screw 82, for example, in a manner such that it is held against the portion 46. By doing this, the ring member 40a can be held for rotation between the backup member 80 and the receiving portion 46.

Figure 5B:
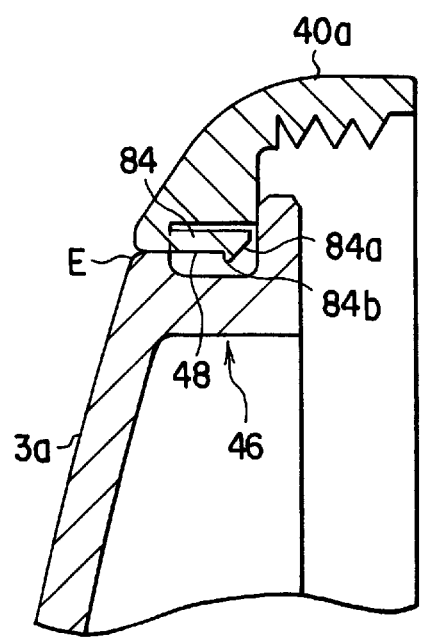
FIG. 5B is a view showing another modification of the fishing reel according to the invention in a state such that the left-hand ring member is attached to the left-hand side plate for rotation by screwing.

Alternatively, a retaining click 84 may be formed protruding from the left-hand ring member 40a so that it can be fitted in the fitting groove 48 of the receiving portion 46, as shown in FIG. 5B, for example.

According to this mounting method, the left-hand ring member 40a is slid along the receiving portion 46 so that a taper portion 84a on the distal end of the retaining click 84 is held against an edge E of the fitting groove 48 (i.e., outer peripheral end of the left-hand side plate 3a). Thereafter, the ring member 40a is further slid along the receiving portion 46. As this is done, the click 84 is elastically deformed so that the taper portion 84a gets over the edge E. Thereupon, the click 84 gets into the fitting groove 48 of the receiving portion 46 to be fitted therein. A retaining projection 84b is formed on the taper portion 84a. If the left-hand ring member 40a moves in the direction to be disengaged from the receiving portion 46, the projection 84b engages the edge E, thereby restraining further movement of the ring member 40a. Thus, the ring member 40a can be rotatably held on the receiving portion 46.

Figure 6:
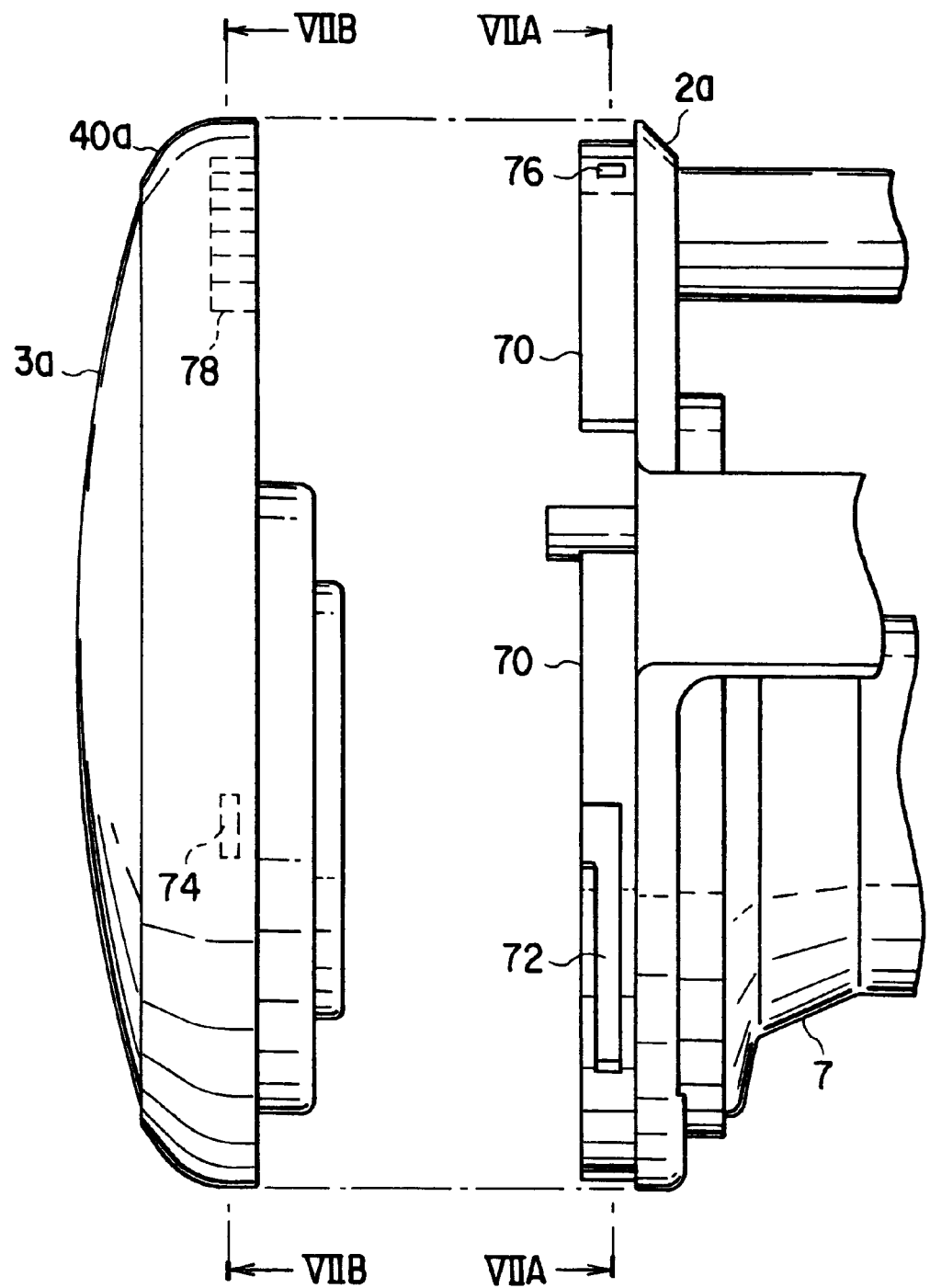
FIG. 6 is an exploded view showing a modification of the fishing reel according to the invention in a state such that the left-hand ring member is attached to the left-hand frame by a cam-locking method.
Figure 7A:
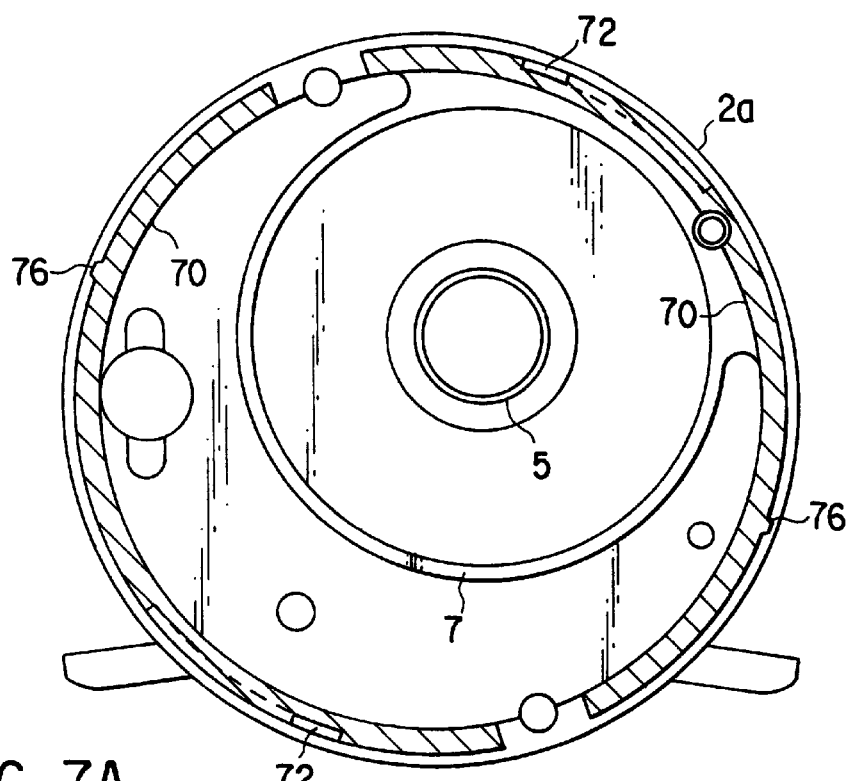
FIG. 7A is a sectional view taken along line VIIA—VIIA of FIG. 6.
Figure 7B:
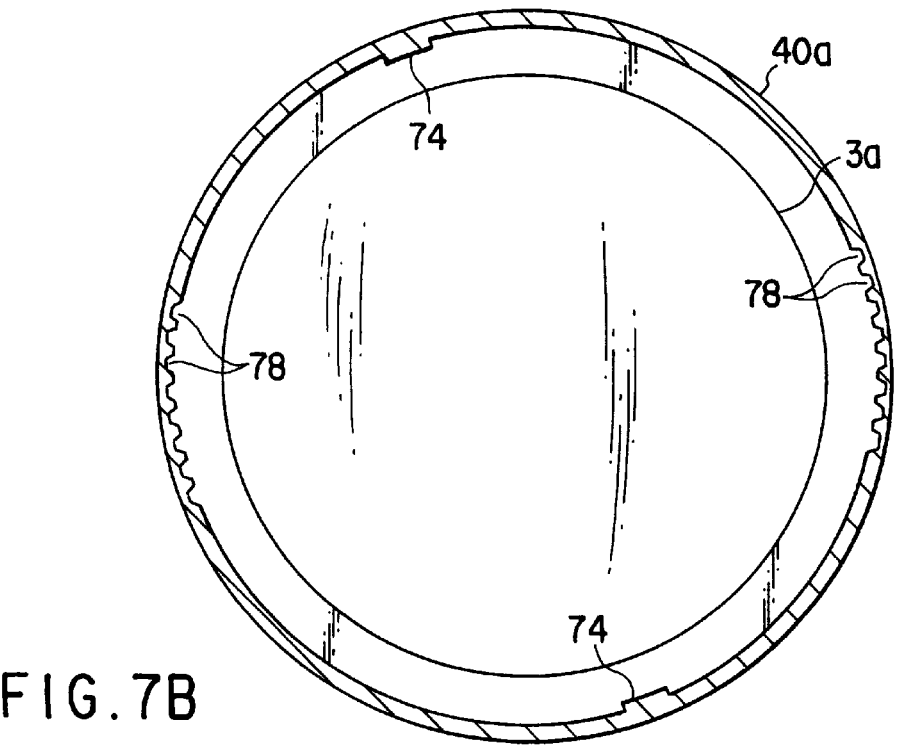
FIG. 7B is a sectional view taken along line VIIB—VIIB of FIG. 6.

The left-hand ring member 40a may be removably attached to the lateral portion of the left-hand frame 2a by a cam-locking method, such as the one shown in FIGS. 6, 7A and 7B, for example.

More specifically, a cam body 70 is formed protruding along the lateral portion of the left-hand frame 2a, and a substantially L-shaped cam groove 72 is formed on the outer peripheral surface of the cam body 70. On the other hand, the inner peripheral surface of the left-hand ring member 40a is formed having a cam protrusion 74 that can be fitted into the groove 72 to be in engagement with it. With use of this cam structure, the ring member 40a can be removably attached to the lateral portion of the frame 2a by being rotated along the cam groove 72 after its cam protrusion 74 is fitted into the groove 72 in an aligned manner.

In this case, a stopper 76 is formed protruding from the outer peripheral surface of the cam body 70 of the left-hand frame 2a, and a plurality of retaining grooves 78 capable of engaging the stopper 76 are formed on the inner peripheral surface of the left-hand ring member 40a. When the ring member 40a is rotated along the cam groove 72 of ring member 40a, in this arrangement, the stopper 76 engages the grooves 78 in succession, thereby adjusting the rotation of the ring member 40a by stages and preventing the ring member 40a from rotating to cause the cam protrusion 74 to be disengaged from the groove 72.

This cam-locking method may be also applied to the attachment between the right-hand ring member 40b and the right-hand frame 2b. A repeated description of an arrangement for this application is omitted.

Although the circular double-bearing fishing reel has been described in connection with the foregoing embodiment, the present invention may be also applied to a fishing reel of a single-sided support type.

A fishing reel according to a second embodiment of the invention will now be described with reference to the accompanying drawings. The fishing reel according to the present embodiment is a double-bearing fishing reel.

Figure 8:
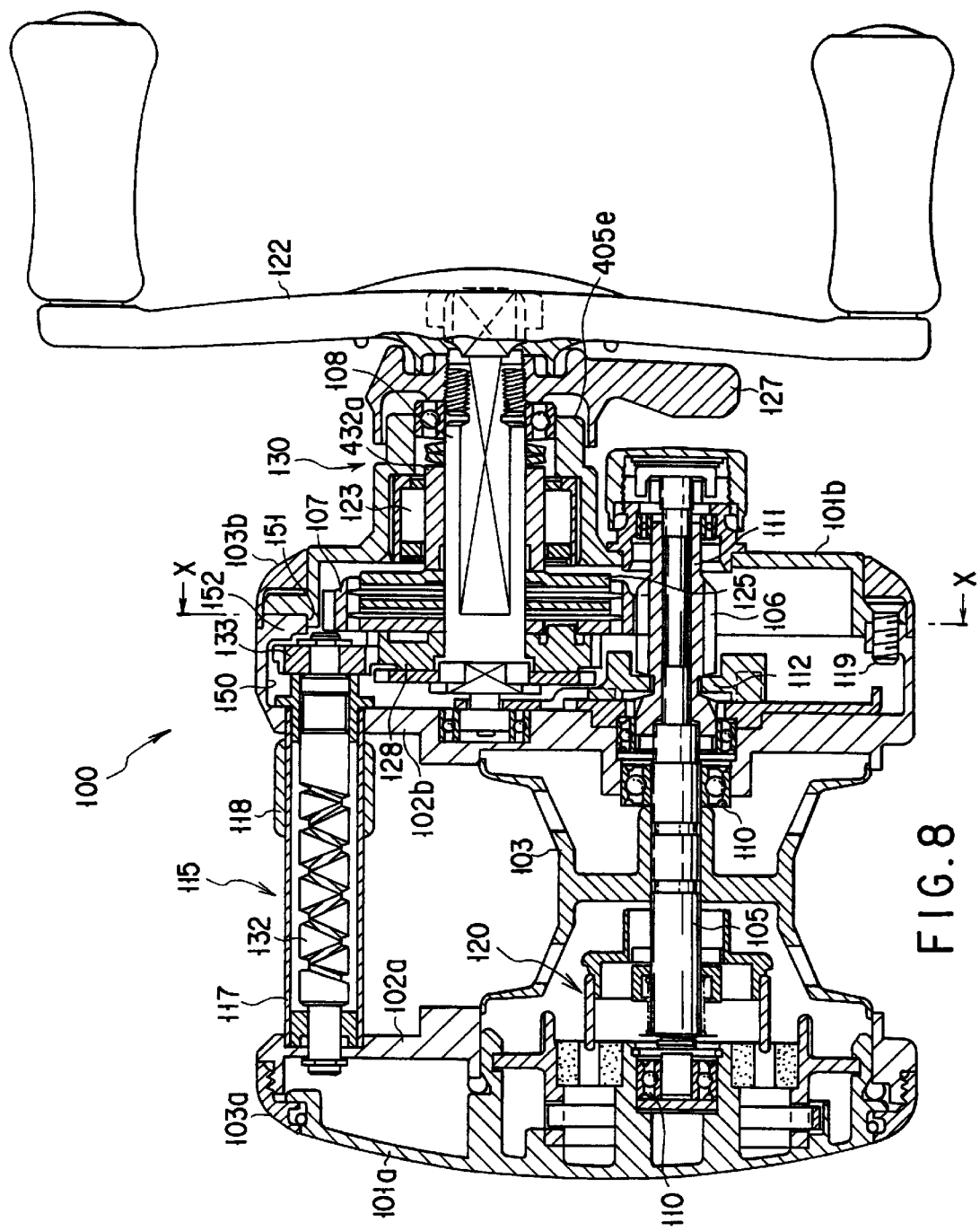
FIG. 8 is a sectional view of a fishing reel according to a second embodiment of the invention.

As shown in FIG. 8, a double-bearing fishing reel 100 according to the present embodiment comprises a spool 103 wound with a fishing line and a reel body that supports the spool 103 for rotation. The reel body is composed of left- and right-hand frames 102a and 102b supporting the spool 103 and side plates 101a and 101b that are attached to the lateral portions of the frames 102a and 102b, respectively. The frames 102a and 102b are formed integrally with a plurality of support posts 140 (see FIG. 9) that are stretched between them. That side plate (hereinafter referred to as supporting side plate) 101b which is situated on the right-hand side of FIG. 9 supports a take-up drive section 130 for rotating the spool 103.

A fixed space is defined between the right-hand frame 102b and the supporting side plate 101b. Various mechanisms (not shown), such as a driving force transmission system, drag system, etc., are stored in this space. The side plates 101a and 101b have a circular shape, and can be attached to the frames 102a and 102b, respectively, by means of screws or by screwing or fitting, for example. In the case where screws 119 are used for the attachment, ring members 103a and 103b may be mounted on the side plates 101a and 101b, respectively, so as to conceal the screws 119 thereunder.

A spool shaft 105 is rotatably supported between the left- and right-hand frames 102a and 102b by means of a pair of bearings 110. The spool 103 wound with the fishing line is fixed integrally to the shaft 105.

A pinion 106, which is movable in the axial direction of the spool shaft 105, is mounted on an end portion of the shaft 105 that projects from the right-hand frame 102b. The pinion 106 is rotatably supported on a pinion shaft 111, and is movable between an engaged position in which it is in engagement with the spool shaft 105 and a disengaged position in which it is disengaged from the shaft 105. Switching means (not shown) is used to change the position of the pinion 106. More specifically, the pinion 106 is formed having a circumferential groove in which a clutch plate 112 is fitted. The clutch plate 112, which can be moved along a pinion shaft 111 by means of a connecting mechanism (not shown), is driven by actuating a clutch switching member (not shown). Thus, as the clutch switching member is depressed, the pinion 106 is moved to the right from the position shown in FIG. 8 by means of the clutch plate 112, whereupon it is disengaged from the spool shaft 105 (clutch OFF). As this is done, the spool 103 is allowed to rotate freely.

Further, the pinion 106 is in mesh with a driving gear 107, which is fitted with a handle shaft 108 that constitutes the take-up drive section 130. The shaft 108 is rotatably supported on the supporting side plate 101b in a manner such that it bears the driving gear 107 that is in mesh with the pinion 106. Furthermore, an end portion of the handle shaft 108 is fitted with a handle 122, which constitutes the take-up drive section 130 in conjunction with the shaft 108. When the handle 122 is rotated, in this case, the spool shaft 105 is rotated by means of the driving gear 107 and the pinion 106, whereupon the spool 103 rotates.

A one-way clutch 123 is provided in the middle of the handle shaft 108. It allows the shaft handle shaft 108 to rotate in one direction only. The proximal end portion of the shaft 108 is provided with a friction plate 125 (drag mechanism), which can engage the driving gear 107. A drag control member 127 is attached to the handle 122. As the member 127 is rotated, the friction plate 125 is pushed in the axial direction to engage the driving gear 107 frictionally, thereby producing a desired drag force.

A gear 128 is provided on the proximal end of the handle shaft 108. The gear 128 is in mesh with the driving gear 107 and a driving gear 133 for driving a worm shaft 132 of a level-wind mechanism 115 that is located ahead of the spool 103.

The level-wind mechanism 115 includes the worm shaft 132, a cylinder 117 that houses the shaft 132, and a line guide member or slider 118. The worm shaft 132, which has a helical groove on its outer peripheral surface, is fitted with the driving gear 133 on one end thereof. The slider 118 is designed to engage the helical groove and slide from side to side along the cylinder 117 as the shaft 132 rotates. The fishing line is guided to the spool 103 through a hole in the slider 118. When the handle 122 is rotated, in this case, the spool 103 rotates, and at the same time, the slider 118 slides. Thus, the fishing line can be wound uniformly on the spool 103.

An anti-backlash mechanism 120 is provided on an end portion of an end portion of the spool shaft 105 that projects from the left-hand frame 102a. The mechanism 120 serves to prevent excessive rotation of the spool 103 and backlash during the discharge of the fishing line.

Figure 9:
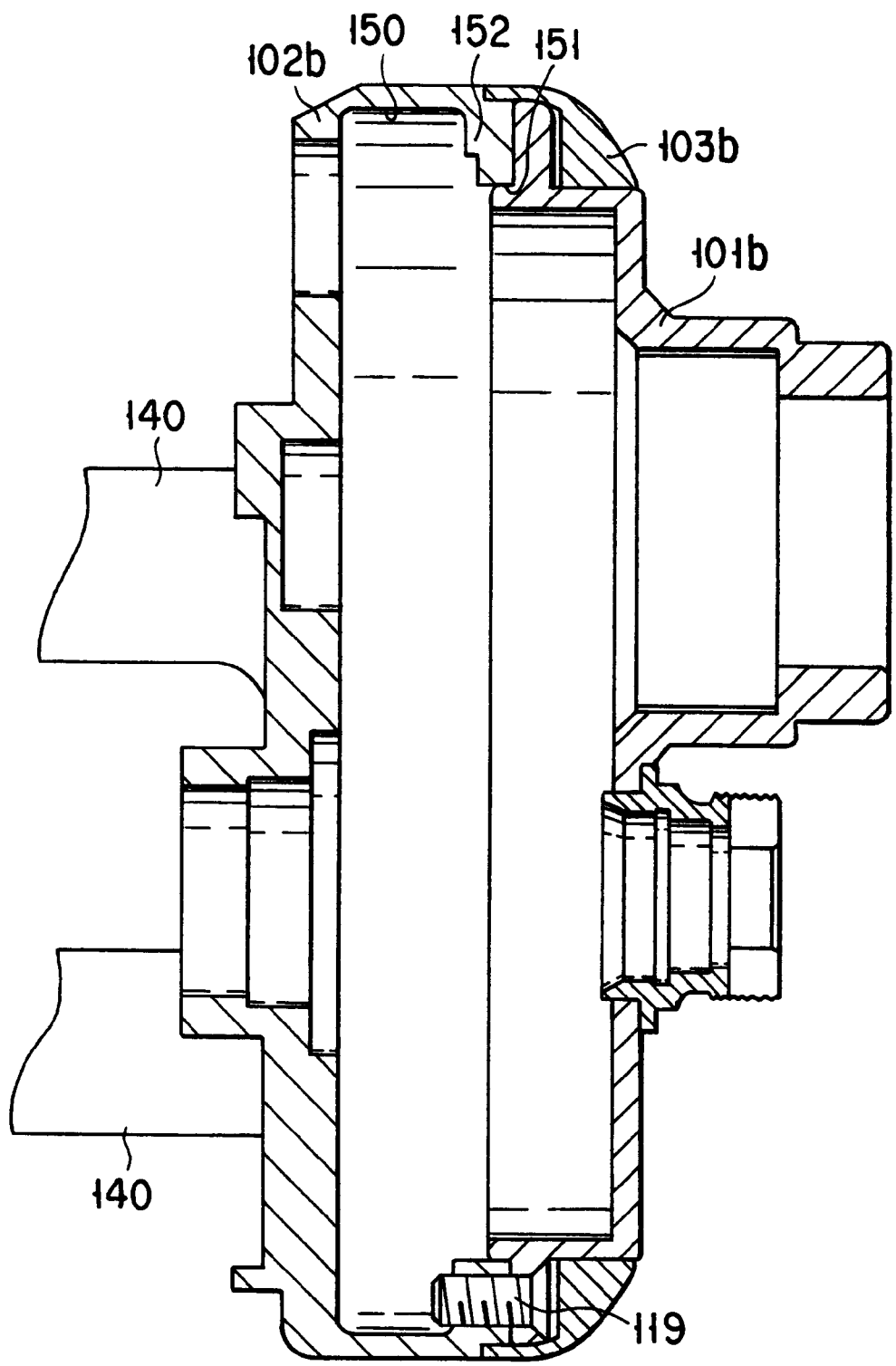
FIG. 9 is an enlarged sectional view showing the principal part of the fishing reel of FIG. 8.
Figure 10:
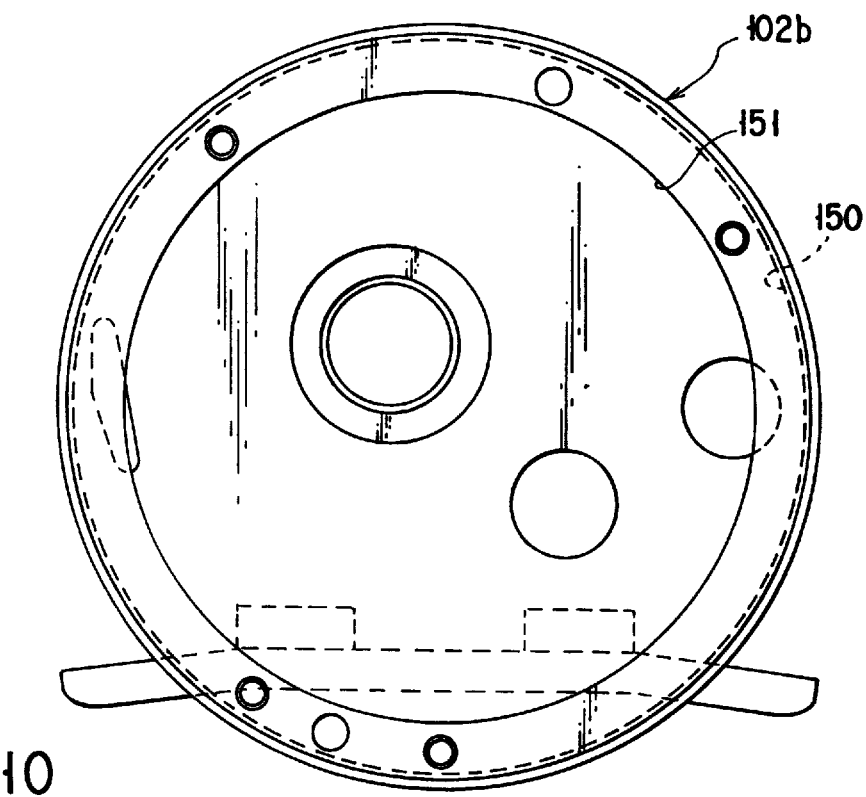
FIG. 10 is a side view of a right-hand frame taken along line X—X of FIG. 8.

In the present embodiment, as shown in FIGS. 9 and 10, the right-hand frame 102b that is fitted with the supporting side plate 101b has the form of a casing such that it defines a storage space 150 that can store the drive mechanisms. An opening 151 is formed in that surface of the frame 102b which faces the side plate 101b. In this case, the diameter of the opening 151 is smaller than that of the space 150 defined inside the opening 151, so that a step portion 152 is formed between the opening 151 and the space 150. Thus, the right-hand frame 102b is a boring structure that is partially notched inside. An end portion of the supporting side plate 101b is fitted in the opening 151.

As shown in FIG. 8, the various drive mechanisms 107, 125, 128 and 133 are stored axially in layers in the space ranging from the storage space to the opening 151. According to the present embodiment, in particular, the large-diameter storage space 150 is defined in the right-hand frame 102b, so that the driving gear 107 is indirectly in mesh with the driving gear 133 of the level-wind mechanism 115 through the gear 128 that is smaller than the gear 107.

In the double-bearing fishing reel 100 according to the present embodiment, as described above, the right-hand frame 102b that is fitted with the supporting side plate 101b is a boring structure (casing). More specifically, the opening 151 is formed in that surface of the frame 102b which faces the side plate 101b, and the storage space 150 having a larger diameter is defined inside the opening 151. According to this configuration, the drive mechanisms can be arranged axially overlapping one another in the space ranging from the storage space 150 to the opening 151. Therefore, the drive mechanisms can be stored without a waste of space, and the supporting side plate 101b and the reel body can be reduced in size. Thus, in this arrangement, the side plate 101b does not store and cover the drive mechanisms therein, but functions as a closing member for closing the opening 151 of the right-hand frame 102b that stores the drive mechanisms. In consequence, the side plate 101b is only expected have the smallest diameter to fulfill the function.

The right-hand frame 102b, a boring structure, can enjoy increased strength despite its reduced weight, so that it can continually maintain a stable function without being influenced by impact or any other external force that is applied thereto when the fishing line is wound up under heavy load or the reel is dropped.

In the present embodiment, moreover, the large-diameter storage space 150 is defined in the right-hand frame 102b, so that the driving gear 107 is not directly in mesh with the driving gear 133 of the level-wind mechanism 115, that is, the gear 107 is indirectly in mesh with the gear 133 through the gear having a smaller diameter. According to this arrangement, the diameter of each drive mechanism can be made smaller than in the case where the driving gear 133 is caused directly to engage the driving gear 107, so that the outside diameter of the supporting side plate 101b can be reduced.

Figure 11:
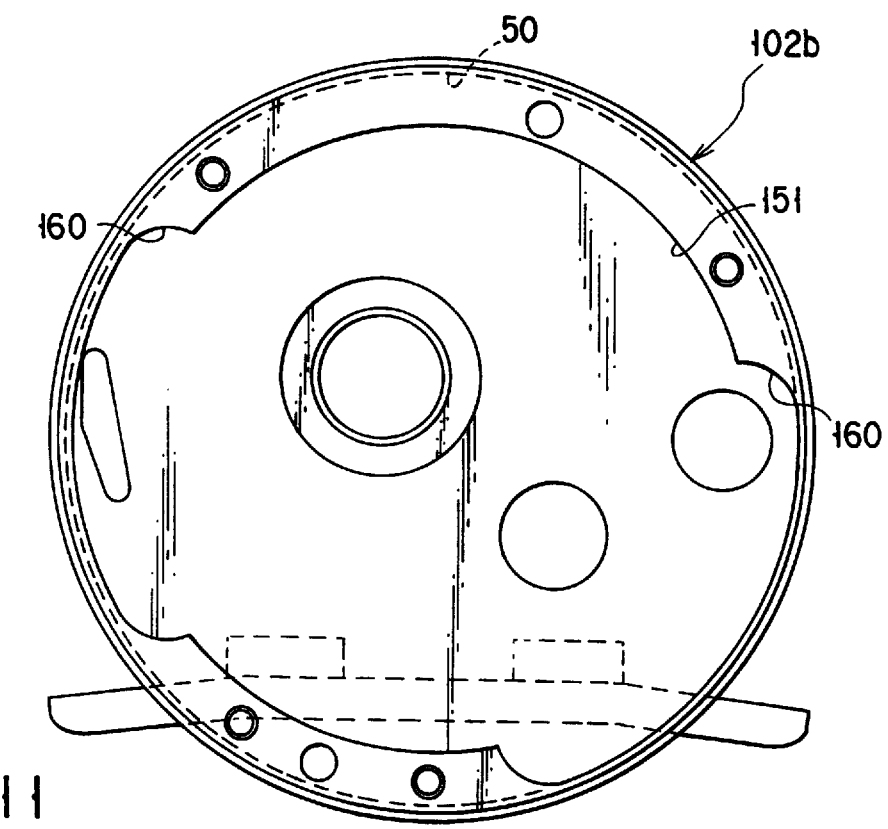
FIG. 11 is a side view of a modification of the right-hand frame taken along line X—X of FIG. 8.

In the present embodiment, furthermore, notches 160 may be formed in the peripheral edge portion of an end face of the right-hand frame 102b in which the opening 151 is formed, the notches 160 opening into the storage space 150, as shown in FIG. 11. The notches 160, formed in this manner, make it easier to incorporate a component having a diameter larger than that of the opening 151 into the space 150.

It is to be understood that the present invention is not limited to the first and second embodiments described above, and that various changes and modifications may be effected therein by one skilled in the art without departing from the scope or spirit of the invention.

Figure 12:
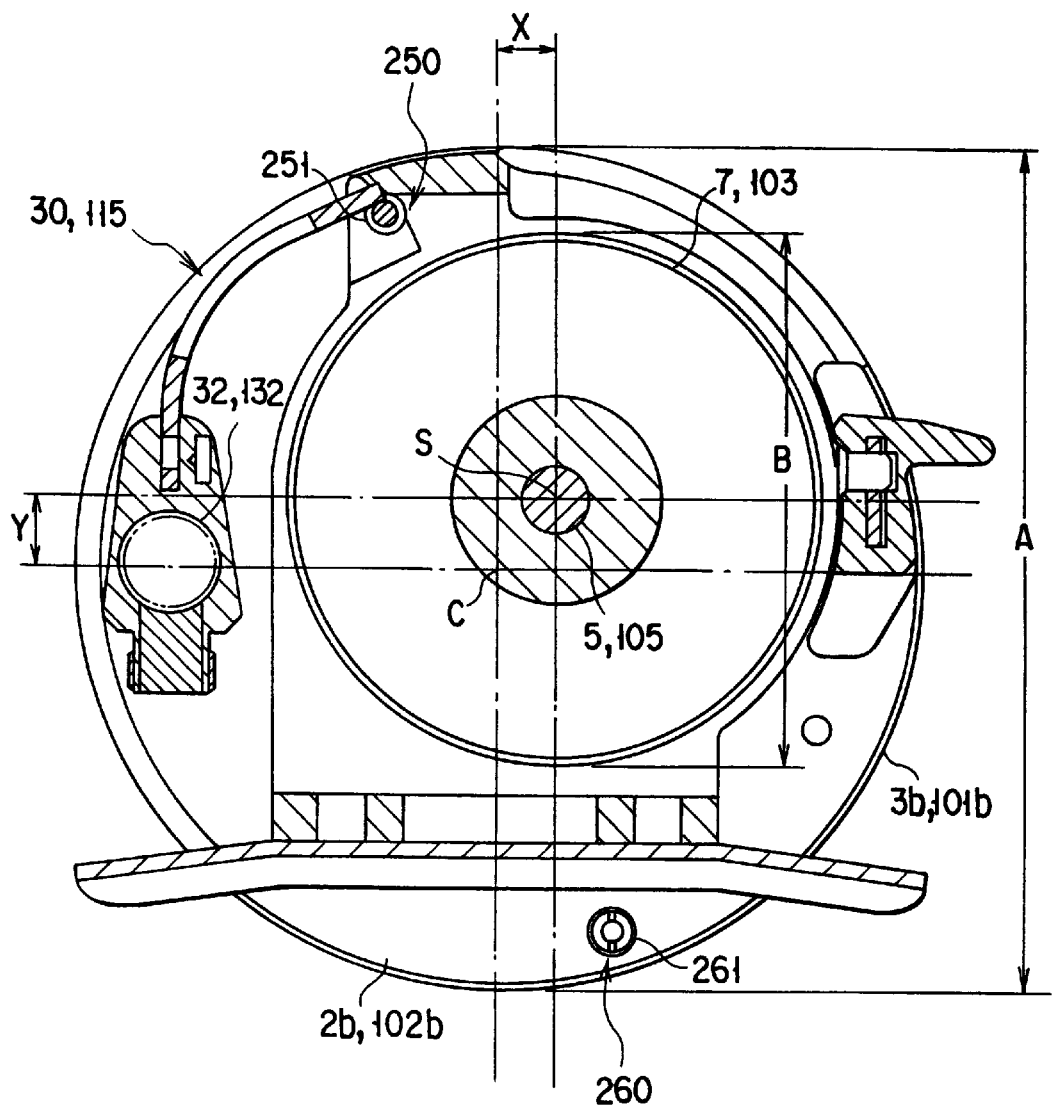
FIG. 12 is a view showing an arrangement of a fishing reel according to a first modification of the invention.

As a first modification, the axis (S) of the spool 7 or 103 may be shifted rearward (in a direction X) and upward (in a direction Y) from the center (C) of the external shape of the side plate 3b or 101b, as shown in FIG. 12, for example.

First, in the case where the axis S of the spool 7 or 103 is shifted rearward from the center C of the side plate 3b or 101b, a long distance can be secured between the level-wind mechanism 30 or 115 and the spool 7 or 103. During reel-off or reel-up operation for the fishing line, therefore, the frictional resistance between the line and the line guide member can be lowered. In consequence, damage to the line can be reduced, and the range of the fishing tackle can be lengthened. In this case, the displacement X of the axis S of the spool 7 or 103 from the center C of the side plate 3b or 101b is set within the range from 1 to 10 mm, and preferably from 3 to 8 mm.

In the case where the axis S of the spool 7 or 103 is shifted upward from the center C of the side plate 3b or 101b, the external dimension (A) of the side plate 3b or 101b is adjusted to 50 to 70 mm, the external dimension (B) of the spool 7 or 103 to 30 to 50 mm, and the ratio of B to A to 60 to 75%, and preferably 62 to 70%. According to this arrangement, a waste of space can be eliminated, so that the reel can be reduced in size, and the general balance of the reel can be improved to enhance the angling performance. In this case, the displacement Y of the axis S of the spool 7 or 103 from the center C of the side plate 3b or 101b is set within the range from 1 to 10 mm, and preferably from 3 to 8 mm.

Figure 13:
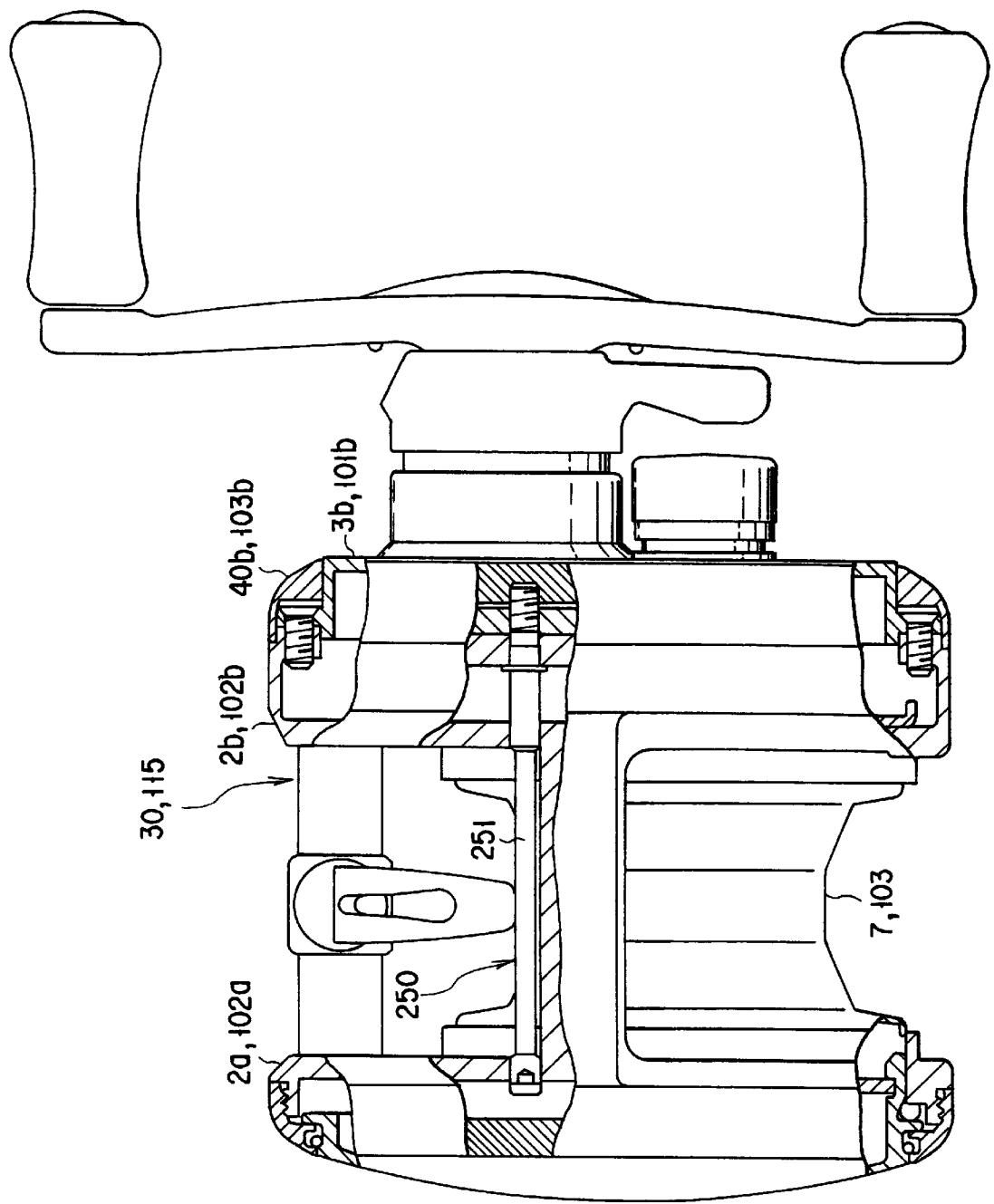
FIG. 13 is a view showing an arrangement of a fishing reel according to a second modification of the invention.

As a second modification, the ring member 40b or 103b may be fixed to the side plate 3b or 101b by means of first and second fastening mechanisms 250 and 260 (see FIG. 12), as shown in FIG. 13, for example.

The first and second fastening mechanisms 250 and 260 are provided with first and second shafts 251 and 261, respectively. The shafts 251 and 261 extend penetrating the left-hand frame 2a or 102a and the right-hand frame 2b or 102b, and a screw is formed on each of their respective extending ends. According to this arrangement, the ring member 40b or 103b is fixed firmly to the side plate 3b or 101b by means of the first and second fastening mechanisms 250 and 260.

As a third modification, the side plate 3b or 101b may be formed having a circular shape such that the aforementioned various mechanisms, including the driving force transmission system, drag system, etc., can be arranged between the side plate 3b or 101b and the right-hand frame 2b or 102b, as shown in FIG. 14, for example. In this case, a notch 305 is formed in that portion of the outer periphery of the side plate 3b or 101b on which the driving gear 18 or 107 is located. The gear 18 or 107 can be partially exposed through the notch 305. According to this arrangement, the driving gear 18 or 107 can be radially extended through the notch 305 without enlarging the side plate 3b or 101b or the reel as a whole. Thus, the line reel-up speed can be increased.

In this case, the shape and size of the ring member 40b or 103b are not limited to those of the foregoing embodiments, must only be ones such that the ring member can conceal the notch 305. In the case where the circular side plate 3b or 101b is attached to the right-hand frame 2b or 102b by means of the screws 42 or 119, as in the foregoing embodiments, the shape and size of the ring member 40b or 103b should preferably be adjusted so that the exposed portions of the screws 42 or 119 and the driving gear 19 or 107 are concealed integrally. According to this arrangement, if an angler lets the reel fall by mistake while he or she is moving between fishing places, the outer peripheral portion of the reel, which is most fragile and liable to deformation, is protected by the ring member 40b or 103b. Only the ring member should be replaced depending on the degree of damage or deformation.

As a fourth modification, the one-way clutch 23 or 123 may be constructed in the manner shown in FIGS. 15A and 15B, for example. In this case, the clutch 23 or 123 comprises an inner ring 432a (see FIGS. 1 and 8), a rollers 432b on the ring 432a, a cage 432c, and an outer ring 432d. The cage 432c holds the rollers 432b and urges them in the clockwise direction. The outer ring 432d surrounds the rollers 432b and the cage 432c.

Free-rotation regions 432e and wedge regions 432f are formed in those portions of the inner peripheral surface of the outer ring 432d which are in contact with the rollers 432b. The rollers 432b are freely rotatable in the free-rotation regions 432e and are prevented from rotating in the wedge regions 432f. They are urged toward the wedge regions 432f by urging means (not shown) attached to the cage 432c.

On the other hand, projecting stopper portions 432g are formed at equal spaces on the outer peripheral surface of the outer ring 432d, corresponding to the portions on which the rollers 432b are arranged. Each stopper portion 432g bulges out for a given height in the radial direction of the outer ring 432d.

The outer ring 432d is fitted in a stabilizer 405e (see FIG. 1 or 8) that is formed on the side plate 3b or 101b. The stabilizer 405e is formed having a retaining portion 405f and a hole 405g. The retaining portion 405f prevents the one-way clutch 23 or 123 from slipping off on the handle side. The handle shaft 20 or 108 that is attached to the clutch 23 or 123 can be passed through the hole 405g. Further, recesses 405h are formed in the inner peripheral surface of the stabilizer 405e. The projecting stopper portions 432g on the outer ring 432d can be fitted into the recesses 405h.

In this arrangement, the recesses 405h are fewer than the stopper portions 432g of the outer ring 432d. More specifically, the stopper portions 432g are eight in number, and four recesses 405h are arranged at equal spaces. In this case, the one-way clutch 23 or 123 is fixed to the stabilizer 405e in a manner such that each two adjacent stopper portions 432g are fitted together in each corresponding recess 405h.

Figure 16A:
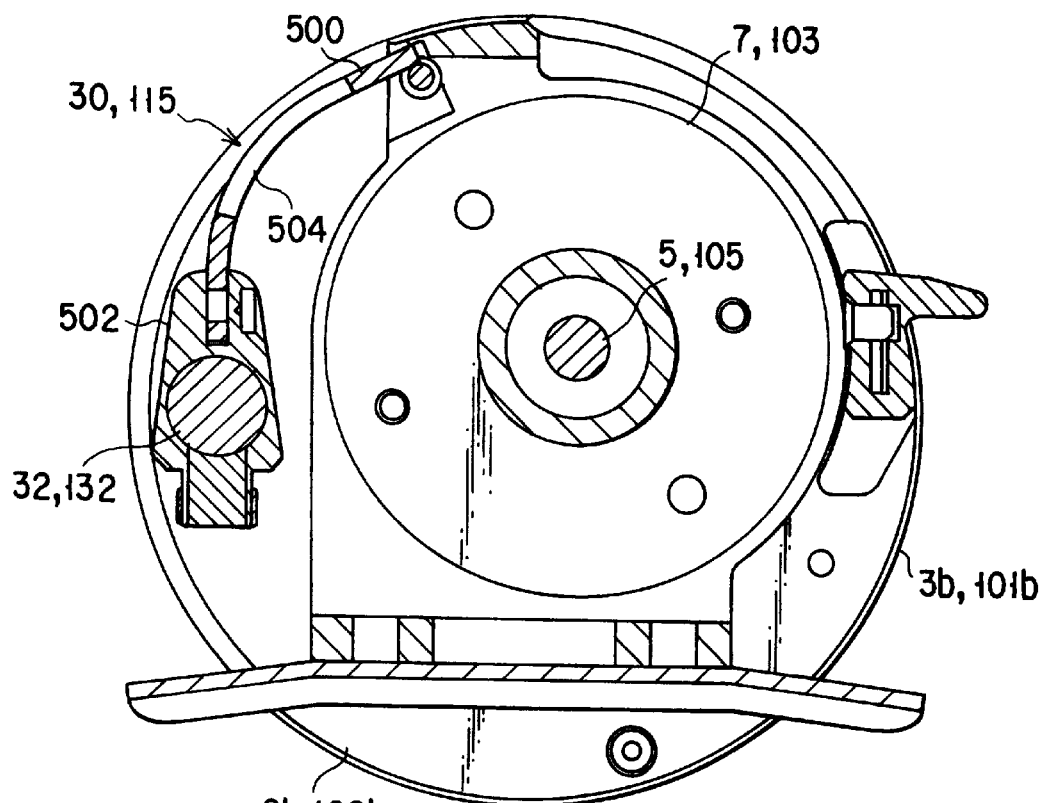
FIG. 16A is a sectional view showing an arrangement of a line guide member applied to a fifth embodiment of the invention.
Figure 16B:
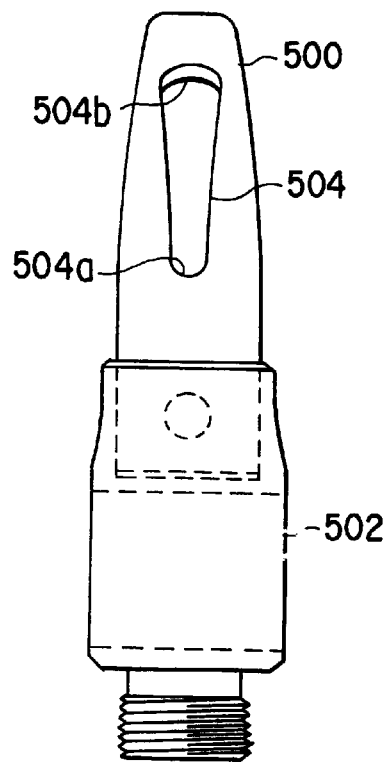
FIG. 16B is a plan view showing an arrangement of the line guide member applied to the fifth embodiment of the invention.

As a fifth modification, a line guide member 500 of the level-wind mechanism 30 or 115 may be constructed in the manner shown in FIGS. 16A and 16B, for example. In this case, the guide member 500 is generally curved along the external shape of the reel body. The proximal end of the member 500 is connected to the worm shaft 32 or 132 by means of a slider 502, while the distal end is tapered. A slot-shaped opening 504 for the fishing line is formed in the center of the member 500. This line guide member 500 can be formed by pressing a stainless-steel plate with a thickness of, e.g., about 1.2 mm, punching out a substantially rectangular piece, and then bending it.

The opening 504 is generally curved along the external shape of the reel body so that it can guide the fishing line steadily and smoothly during the line reel-off or reel-up operation, and its lower and upper portions 504a and 504b are relatively changed in width. More specifically, the opening 504 is tapered so that its width is continuously reduced from the upper portion 504b toward the lower portion 504a.

In this arrangement, the fishing line is kept in contact with the narrower lower portion 504a of the opening 504 as it is wound up by the spool 7 or 103 through the opening 504. Since the line is guided by the narrower portion 504a in this case, it can be reeled up in a stable state. On the other hand, the line is kept in contact with the wider upper portion 504b as it is reeled off through the opening 504. Since the frictional resistance between the wider portion 504b and the line is lowered in this case, the line can be reeled out smoothly. In consequence, the range of the tackle can be lengthened.

What is claimed is:

1. A fishing reel comprising:
   a frame;
   side plates located on opposite sides of said frame, individually;
   a ring member for removably attaching at least one of said side plates to said frame;

mounting means capable of removably mounting said ring member on said frame; and a retaining member for rotatably supporting said ring member on said at least one of said side plates without disengaging.

2. The fishing reel according to claim 1, wherein said retaining member supports said ring member for rotation on said at least one of said side plates without disengaging by utilizing an elastic force thereof.

3. The fishing reel according to claim 1, wherein said retaining member is stored in a space defined in a region where said ring member and said at least one of said side plats face each other.

4. A fishing reel comprising:

a spool wound with a fishing line;

a reel body supporting said spool for rotation; and a take-up drive section for rotating said spool, wherein said reel body includes a frame supporting said spool and a side plate attached to a lateral portion of said frame, said side plate being for supporting said take-up drive section, said frame including an opening formed in a surface thereof opposite to said side plate and a storage space defined inside said opening, having a diameter larger than a diameter of said opening, and being for storing at least said take-up drive section in an axial direction thereof, said opening being closed by said side plate, and said opening and said storage space being defined by successively cutting out said frame such that said frame has a boring structure.

5. The fishing reel according to claim 4, wherein an end face of said frame having said opening therein has a notch formed by extending said opening radially outwardly so as to communicate with sa storage space.

6. A fishing reel comprising:

a frame;

side plates located on opposite sides of said frame, individually;

a ring member for removably attaching at least one of said side plates to frame; and mounting means capable of removably mounting said ring member on said frame, said ring member having a frame-side outer peripheral surface situated substantially flush with an outer peripheral surface of said frame, a side-plate-side outer peripheral surface situated substantially flush with an outer peripheral surface of said frame-side plates, and a smoothly curved outer peripheral surface between said frame-side outer peripheral surface of said ring member and said side-plate-side outer peripheral surface of said ring member.

7. A fishing reel comprising:

a frame;

side plates located on opposite sides of said frame, individually;

a ring member for removably attaching at least one of said side plates to said frame;

mounting means capable of removably mounting said ring member on said frame; and an elastic member located in any one of a gap between said frame and said at least one of said side plates, and said ring member.

8. The fishing reel according to claim 7, wherein said elastic member is located in a gap of said gaps between said frame and said at least one of said side plates.

9. The fishing reel according to claim 7, wherein said mounting means includes a first thread portion formed on said frame and a second thread portion, formed on said at least one of said side plates, mating with said first thread portion, said first thread portion being divided into a plurality of parts by a plurality of notches.

10. A fishing reel comprising:

a frame supporting a spool shaft for rotation;

a spool mounted on said spool shaft for rotation; and a drive mechanism for transmitting a turning effort of a handle, thereby rotating said spool;

said frame defining an opening formed in a surface opposing a side plate, and a storage section storing said drive mechanism, said storage section having an inner surface which is located opposite to said opening, said inner surface serving as a mounting surface on which components of said drive mechanism are attached, said mounting surface being a smooth surface with no irregular portions.

11. A fishing reel comprising:

a spool wound with a fishing line;

a reel body supporting said spool for rotation; and a take-up drive section for rotating said spool, wherein said reel body includes a frame supporting said spool and a side plate attached to a lateral portion of said frame, said side plate being capable of supporting said take-up drive section, said frame including an opening formed in a surface thereof opposite to said side plate and a storage space defined inside said opening, having a diameter larger than a diameter of said opening, and capable of storing at least said take-up drive section in an axial direction thereof, said opening being closed by said side plate, wherein an end face of said frame having said opening therein has a notch formed by extending said opening radially outwardly so as to communicate with said storage space.

12. A fishing reel comprising:

a frame;

side plates located on opposite sides of said frame, individually;

a ring member for removably attaching at least one of said side plates to said frame;

mounting means capable of removably mounting said ring member on said frame; and an elastic member located in at least one of gaps between said frame, said side plates, and said ring member, wherein said mounting means includes a first thread portion formed on said frame and a second thread portion, formed on said at least one of said side plates, mating with said first thread portion, said first thread portion being divided into a plurality of parts by a plurality of notches.

* * * * *